United States Patent [19]

Kelley et al.

[11] Patent Number: 4,872,099
[45] Date of Patent: Oct. 3, 1989

[54] LIGHT FIXTURE

[75] Inventors: David A. Kelley, Springfield; Dan H. Walters, Marshall; James G. Stephenson, Kalamazoo, all of Mich.

[73] Assignee: Progressive Dynamics, Inc., Marshall, Mich.

[21] Appl. No.: 186,922

[22] Filed: Apr. 27, 1988

[51] Int. Cl.[4] .......................... F21V 23/04; H01H 3/20
[52] U.S. Cl. .................................... 362/295; 362/394; 200/330
[58] Field of Search ................. 362/295, 74, 251, 394; 200/330, 331, 292

[56] References Cited

U.S. PATENT DOCUMENTS

| 3,501,599 | 3/1970 | Horecky | 200/330 |
| 3,792,250 | 2/1974 | Kilbourn et al. | 240/7.1 |
| 3,833,784 | 9/1974 | Bobel et al. | 200/330 |
| 4,128,745 | 12/1978 | Marsilio et al. | 200/330 |
| 4,316,067 | 2/1982 | Whiteman, Jr. | 200/292 |
| 4,404,619 | 9/1983 | Ferguson | 362/295 |

Primary Examiner—Ira S. Lazarus
Assistant Examiner—D. M. Cox
Attorney, Agent, or Firm—Beaman & Beaman

[57] ABSTRACT

A light fixture, particularly suitable for recreational vehicles, such as campers, trailers, boats and vans, consisting of a base having a reflector, lens and a bulb controlled by a slide switch. The switch is received within a "drop-in" mounting formed in the base and is retained in its mounting by a manually operated switch actuating slide. The retention structure slidably mounting the slide on the base in cooperation with slide structure superimposed over the switch retains the switch in position minimizing assembly procedures.

7 Claims, 2 Drawing Sheets

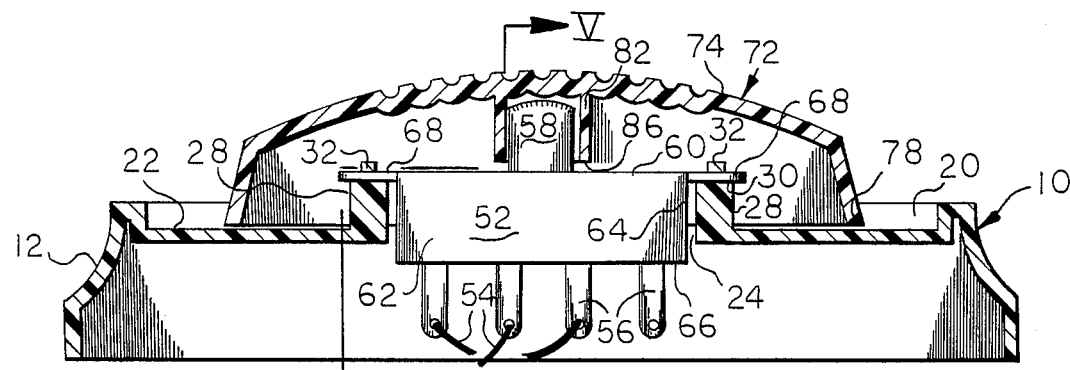
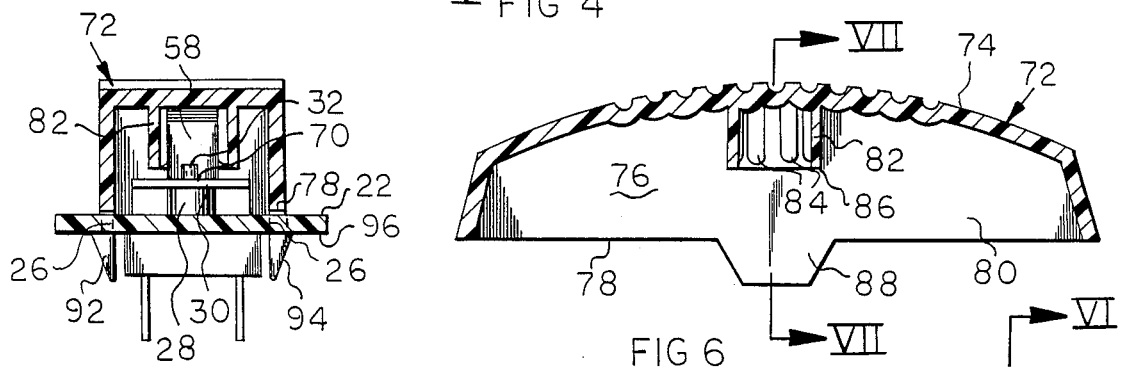
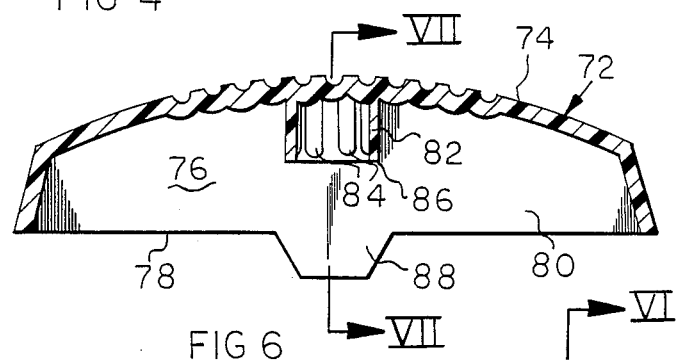
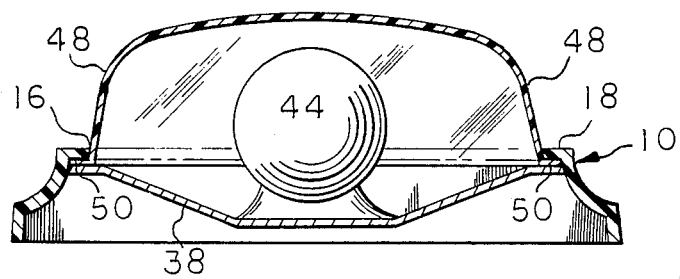
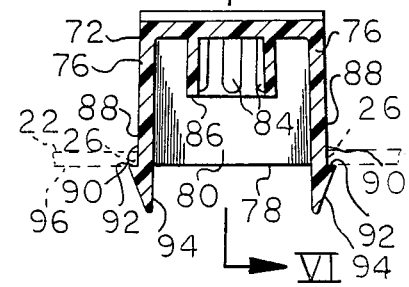
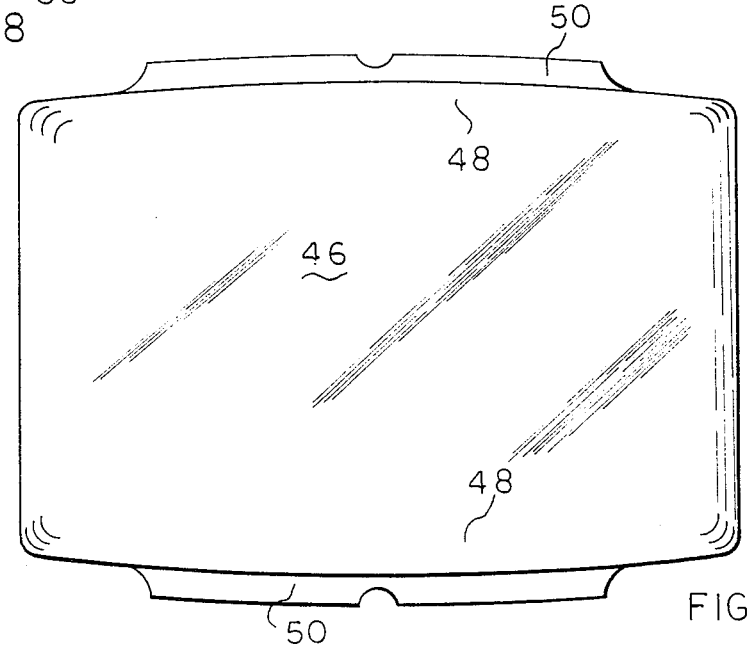

LIGHT FIXTURE

BACKGROUND OF THE INVENTION

Light fixtures for recreational vehicles of both the land and marine type must be of concise dimension, attractive, economical and easy to assemble and operate. Such light fixtures usually include a base, a bulb, a reflector located behind the bulb, a translucent lens and an operating switch.

Usually, the lens is removable for bulb replacement, and the switch must be readily accessible for ease of operation. A typical light fixture of the aforementioned type is shown in the assignee's U.S. Pat. No. 3,792,250.

As recreational light fixtures are produced in great numbers, they must be economical to manufacture and assemble. Due to the presence of the bulb and electric switch, wiring and soldering is required, and as the fixtures will be mounted in environments subjected to extensive vibration the assembly of the components must be firm and dependable.

Light fixtures of this type often utilize slide switches employing an actuator which is linearly movable to make and break the circuits between preselected switch terminals to which the light fixture conductors are soldered. Such switches are concise in dimension, dependable in operation, and available from a number of sources at low cost. While some light fixture manufacturers design the fixture so as to directly utilize the switch actuator for lamp operation, the relatively small size of the switch actuator makes manual operation somewhat difficult, particularly under poor light conditions, and it is desirable that the fixture switch operation be controlled by a relatively large member for ease of operation.

It is an object of the invention to provide a light fixture having a relatively large switch operator, and yet utilize a relatively small and economical electric switch.

A further object of the invention is to provide a light fixture utilizing a manually operated switch operator and a relatively small slide switch wherein the switch is mounted within "drop-in" mounting means and the switch operator maintains the switch in its desired mounted position.

An additional object of the invention is to provide a light fixture utilizing a relatively small switch having a linearly displaceable actuator wherein a relatively large switch operator is slidably mounted upon the fixture base and includes structure which retains the switch in an operative position and eliminates secondary operations to affix the switch in its operative position.

In the practice of the invention a light fixture base molded of synthetic plastic material includes a bulb-receiving compartment in which a reflector is mounted, and the compartment is partially enclosed by a lens, usually translucent. A bulb is located within the fixture compartment intermediate the lens and reflector.

An electric switch of the slide type is located within mounting structure defined on the base in the form of a recess, posts, supporting and locating studs received within holes defined in tabs formed on the switch. The switch is "dropped in" the recess defined on the fixture base so that the holes on the switch tab receive the positioning studs defined on the columns. No screw, rivets, heat deformation of the plastic or other usual retaining structure is employed to position the switch on the base and affix it thereto.

A switch operator in the form of a slide is slidably mounted upon the base and as the slide is of an inverted dish configuration forming an internal chamber the slide is superimposed over the switch shielding the switch from view. The edges of the slide rest upon a planar surface defined on the base about the switch-receiving structure, and a pair of resilient fingers defined on the slide on opposite sides of the switch engage parallel edges of the base and include shoulder engaging base surfaces to slidably retain the slide on the base.

The slide also includes switch retaining surfaces in adjacent opposed relationship to the portion of the switch facing the slide. These switch retaining surfaces prevent the switch from being displaced from its mounting means and as the slide is accurately retained on the base the switch retaining structure also functions to prevent the switch from being displaced from its mounting structure. Thus, once the switch is properly positioned the assembly of the switch operator slide to the base simultaneously assembles the slide to the base and retains the switch upon the base. The elimination of secondary switch retaining operations significantly reduces the cost and assembly of the manufacture of the fixture without adversely affecting the quality, dependability and operation of the assembly.

BRIEF DESCRIPTION OF THE DRAWINGS

The aforementioned objects and advantages of the invention will be appreciated from the following description and accompanying drawings wherein:

FIG. 4 is an elevational, sectional view taken along Section IV—IV of FIG. 1, FIG. 5 is an elevational, sectional view as taken along Section V—V of FIG. 4, FIG. 6 is an elevational sectional view taken of the switch operator slide, per se, as taken along Section VI—VI of FIG. 7, FIG. 7 is an elevational, sectional view taken of the switch operator slide along Section VII—VII of FIG. 6, FIG. 8 is an elevational, sectional view as taken along Section VIII—VIII, and FIG. 9 is a plan view of a lens, per se, as used with the light fixture of the invention.

BRIEF DESCRIPTION OF THE PREFERRED EMBODIMENTS

Figure 1:
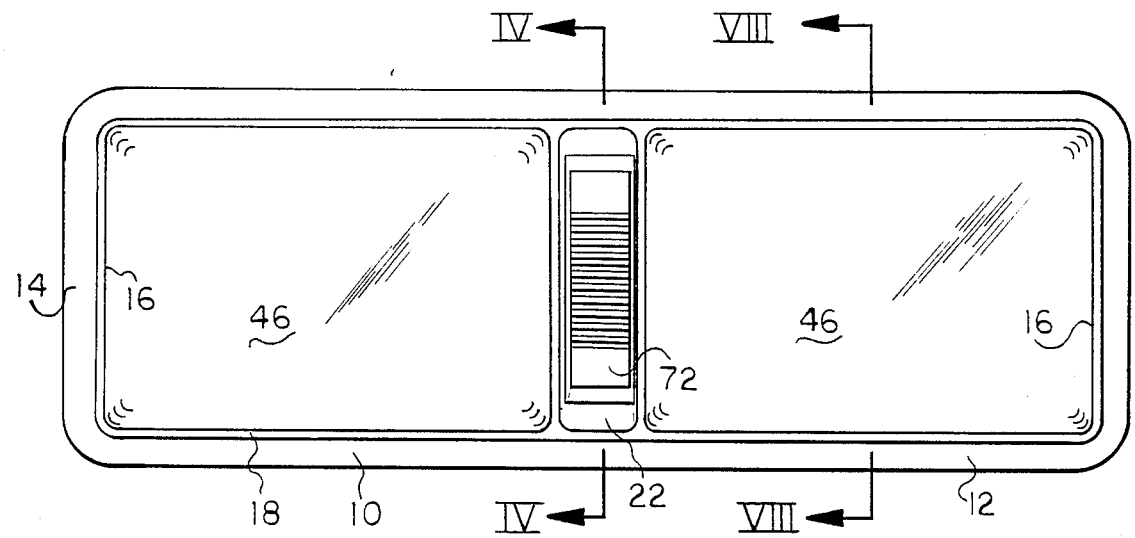
FIG. 1 is a plan view of a light fixture in accord with the invention illustrating the double lens embodiment with the switch operator in an intermediate position.

A light fixture using the inventive concepts employs a base 10 of an elongated configuration. As best illustrated in FIGS. 4 and 8, the base includes lateral sides 12, ends 14 and a generally rectangular lens-receiving opening 16. In the two lens version shown in FIGS. 1 and 2, two lens-receiving openings 16 are defined in the base as formed by a flange 18, FIG. 8. Centrally, a recess 20 is defined between the lens openings having a flat surface 22. A switch-receiving opening 24 is defined in the surface 22 by spaced parallel opposed edges 26, FIG. 5, and is of a generally elongated configuration as will be appreciated from the embodiment of FIG. 3. At the ends of the opening 24 upwardly extending winged posts 28 are homogeneously defined on the recess surface 22 and each post includes a flat positioning surface 30 from which a circular stud 32 centrally extends. The post's transversely extending wings give significant lateral dimension to the surfaces 30 with respect to the length of the opening 24.

Figure 2:
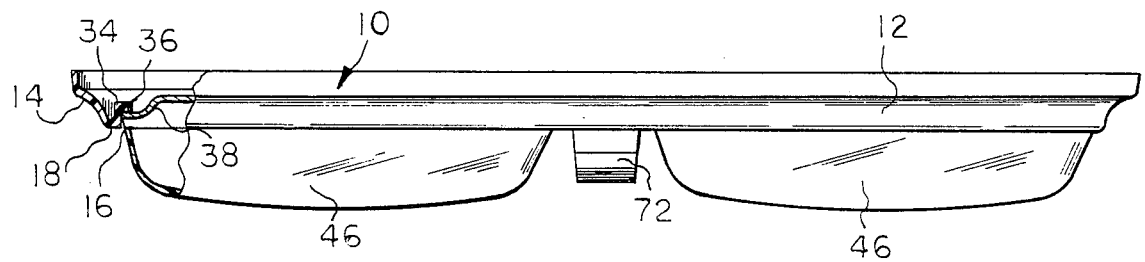
FIG. 2 is a side, elevational view of the light fixture of FIG. 1, partially sectioned.

The base flange 18 includes an inward extending hook 34, FIG. 2, defined adjacent the ends of the lens openings 16 having a surface 36, and the lip of a metal reflector 38 engages the surface 36 of the flange hook. The reflector 38 includes an upstanding portion 40, FIG. 3, in which a bulb socket 42 is mounted and the bulb 44 is received therein.

A synthetic plastic translucent lens 46 is mounted within each opening 16 and the lens is of a convex-concave configuration including sides 48 of sufficient dimension to enclose the bulb 44, FIG. 8, and the lateral edges of the lens are outwardly formed to define a lip 50 of a configuration readily appreciated from FIG. 9. The lips 50 are defined on the lens only at the lateral edges of the lens and in the central region thereof. The lens is installed within its associated opening 16 by gripping the lateral sides 48 and compressing the lateral edges toward each other and thereupon the lens lips 50 may be inserted under the base flange 18 and upon the reflector lip as apparent in FIG. 8. Upon release of the lens sides 48 the resilient nature of the lens material causes the lateral sides to spring outwardly so that the lens lips will be located below the base flange 18 as illustrated.

The bulb 44 is controlled by switch 52 through electrical wire conductors 54. The switch includes a plurality of terminals 56 to which the conductors are attached, and the switch is operated by a handle or actuator 58 extending from the top surface 60 of the switch. The switch includes side surfaces 62, end surfaces 64 and a bottom surface 66. The switch is of a conventional slide type available from a number of sources, and includes mounting tabs 68 which are located adjacent the top surface 60 and each tab includes a hole 70 slightly larger than a stud 32.

The configuration of the base opening 24 is such as to readily receive the switch 52 therein, and the lateral width of the opening 24 is greater than the width of the switch or defined by sides 62. Thus, the switch 52 may be easily dropped into the opening 24 such that the holes 70 on the switch tabs 68 receive the studs 32, and the underside of the tabs 68 engage the post surfaces 30. The reception of the studs 32 within the holes in the tabs 68, and the engagement of the underside of the tabs with the post surfaces prevents movement of the switch 52 relative to the base 10 in all directions except upwardly with respect to the orientation of FIG. 4.

The actuator 58, in the usual manner, is movable to the left and right, FIG. 4, in a linear manner, and depending on the position of the actuator particular electrical circuits are determined through the switch to selective terminals. Thus, depending on the position of the actuator, one bulb, or two bulbs, may be selectively energized in a two lens fixture and the particular wiring circuit of the switch is conventional and not part of the novel subject matter of the invention.

The switch 52 is controlled by an operator slide 72 of an elongated inverted dish-shape configuration. The slide includes a convex-concave surface 74 preferably having ridges defined thereon to facilitate manual movement of the slide. The lateral sides 76 of the slide terminate in a planar locating edge 78 adapted to engage the base planar surface 22 or be positioned slightly thereabove.

Internally, the slide 72 is provided with a chamber 80 having a hollow stem 82 homogeneously and centrally defined therein having ribs 84 defining a transverse cross-sectional configuration closely receiving the transverse cross-sectional configuration of the switch actuator 58, and the innermost end of the tubular stem 82 is defined by end surface 86. As will be appreciated from FIGS. 4 and 5, the end surface 86 of the stem will be located in opposed and adjacent relationship to the top surface 60 of the switch 52.

Each slide lateral side central region includes a downwardly extending cantilevered resilient finger 88. The fingers 88 each include an outer surface 90 and a shoulder or barb 92 disposed at right angles to the associated surface 90. Also, adjacent its free end each finger includes an oblique cam surface 94.

The spacing between the lateral sides 76 of the slide 72 are related to the spacing of the lateral edges 26 of the base opening 24 wherein the slide 72 may be superimposed over the switch 52 aligning the stem 82 with the switch actuator 58 and the slide is then moved toward the surface 22 permitting the fingers 88 to enter the opening 24. The spacing between the lateral sides of the switch and the base edges 26 are such that the fingers 88 will deform toward each other due to the camming action produced by the finger surfaces 94 as they engage the edges 26 and upon the finger shoulders 92 engaging the base surface 96, FIG. 5, the finger surfaces 90 will engage edges 26. Thus, the shoulders 92 prevent the slide 72 from being pulled away from the surface 22 and engagement of the slide edge 78 with the surface 22 will prevent inward movement of the slide. The slide 72 may be readily moved in a linear manner within the recess 20 as the fingers 88 traverse the openings edges 26. The extent of linear movement of the slide 72 is sufficient to position the switch actuator 58 between its operative positions.

Due to the proximity of the stem end 86 to the top surface 60 of the switch, the stem 82 prevents the switch 52 from moving upwardly, FIG. 4, to sufficiently disengage the studs 32 from the switch tab holes 70, and thus, the slide 72 serves to retain the switch upon its mounting structure eliminating the necessity for any second operations to maintain the switch within the opening 24. This assembly and switch retention system significantly reduces the cost of the light fixture If it is desired to replace the switch 52, it is merely necessary to deflect the ends of the fingers 88 toward each other permitting removal of the slide 70 from the base, and the switch may then be lifted from the opening 24.

Figure 3:
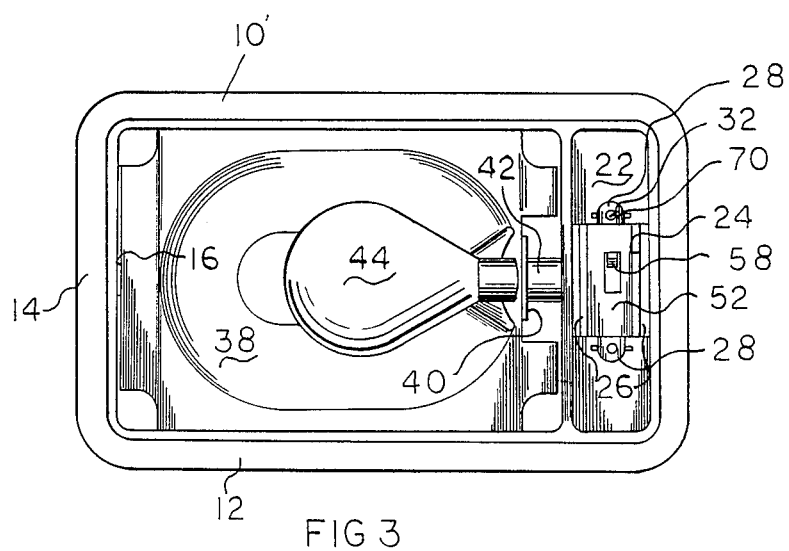
FIG. 3 is a plan view of a single lens light fixture embodiment utilizing the concepts of the invention, the lens being removed for purpose of illustration.

The single lens embodiment of FIG. 3 is identical to the two lens embodiment of FIGS. 1 and 2 in all respects except that only one lens, reflector and bulb is used and the slide is mounted adjacent the end of the base 10' and identical reference numerals are used.

It is appreciated that modifications to the inventive concepts may be apparent to those skilled in the art without departing from the spirit and scope of the invention.

What is claimed :

1. A light fixture including a base, a bulb mounted on said base, electric conductors connected to the bulb and connectable to an electric power source, and a drop-in switch connected to the conductors having lateral sides and ends, a bottom, a top, mounting surfaces and a sliding actuator extending from the switch top, the improvement comprising, drop-in switch mounting means defined on the base receiving the switch and restricting the switch against lateral end movement and movement in the direction of the switch bottom, a manually operated slide directly mounted on the base adjacent said switch mounting means, slide mounting means mounting said slide on said base in a superimposed position relative to the switch top for sliding movement between first and second positions, said slide mounting means restraining said slide against movement in a direction away from the switch top, switch restraining means defined on said slide closely spaced from the switch top preventing displacement of the switch from said drop-in switch mounting means, and switch actuator engaging means defined upon said slide engaging the switch actuator whereby displacement of said slide between said first and second positions operates the switch.

2. In a light fixture as in claim 1, said slide comprising an inverted dish-shaped member having an open bottom and an interior chamber, said switch restraining means and said switch actuator engaging means being defined within said slide chamber.

3. In a light fixture as in claim 1, wherein said switch actuator engaging means comprises a hollow stem defined on said slide within said chamber having an open end defined by end surfaces, the switch actuator being received within said stem through said open end, said stem end surfaces comprising said switch restraining means.

4. In a light fixture as in claim 1, said slide mounting means comprising resilient fingers defined on said slide each having a free end, a shoulder defined adjacent each finger free end for engaging a base surface defined adjacent said switch mounting means, and a pair of substantially parallel, linear, opposed, spaced base surfaces defined upon said base on opposite sides of the switch engaged by said fingers.

5. In a light fixture as in claim 1, said switch mounting means comprising a pair of spaced support surfaces defined on said base, a stud defined on and extending from each support surface, a switch mounting surface engaging each of said support surfaces, and an opening defined in each switch mounting surface receiving a stud.

6. A light fixture comprising, in combination, a base, a bulb mounted on said base, electric conductors connected to the bulb and connectable to an electric power source, a switch connected to said conductors having a sliding actuator, a drop-in switch receiving opening defined upon said base receiving said switch, a planar surface defined on said base about said opening, a pair of spaced, opposed, linear guide edges defined in said planar surface on opposite sides of said opening, an inverted dish-shaped slide having an open side defined by edges and an interior chamber, said slide edges engaging said planar surface and said slide chamber being superimposed over said switch receiving opening, a resilient cantilever finger defined on said slide located on each side of said switch and each having a free end having a shoulder defined thereon whereby each finger engages a guide edge and each finger shoulder extends under the associated guide edge whereby said slide is linearly slidable mounted on said base planar surface and said fingers maintain said slide edges upon said planar surface, switch actuator engaging means defined within said slide chamber engaging said switch actuator, and switch restraining means defined on said slide superimposed over said switch in close proximity thereto maintaining said switch within said opening.

7. In a light fixture as in claim 6, wherein said switch actuator engaging means comprises a hollow stem defined on the slide within said chamber having an open end defined by end surfaces, the switch actuator being received within said stem through said open end, said stem end surfaces comprising said switch restraining means.

* * * * *